(12) United States Patent
Choi et al.

(10) Patent No.: US 8,312,032 B2
(45) Date of Patent: Nov. 13, 2012

(54) DICTIONARY SUGGESTIONS FOR PARTIAL USER ENTRIES

(75) Inventors: Yung Choi, Seoul (KR); Haimin Lee, Kyounggii (KR); Dong-Hwi Lee, Seoul (KR); Jungshik Jang, Seoul (KR)

(73) Assignee: Google Inc., Mountain View, CA (US)

( * ) Notice: Subject to any disclaimer, the term of this patent is extended or adjusted under 35 U.S.C. 154(b) by 363 days.

(21) Appl. No.: 12/171,253

(22) Filed: Jul. 10, 2008

(65) Prior Publication Data

US 2010/0010977 A1   Jan. 14, 2010

(51) Int. Cl.
G06F 7/00 (2006.01)
G06F 17/30 (2006.01)

(52) U.S. Cl. ......... 707/758; 707/760; 707/765; 707/768

(58) Field of Classification Search .................. None
See application file for complete search history.

(56) References Cited

U.S. PATENT DOCUMENTS

| | | | |
|---|---|---|---|
| 5,687,364 A | 11/1997 | Saund et al. | 395/605 |
| 5,761,436 A | 6/1998 | Nielsen | 395/200 |
| 5,805,911 A | 9/1998 | Miller | 395/796 |
| 5,845,300 A | 12/1998 | Comer et al. | 707/508 |
| 5,892,919 A | 4/1999 | Nielsen | 395/200.48 |
| 5,907,680 A | 5/1999 | Nielsen | 395/200.58 |
| 5,920,854 A | 7/1999 | Kirsch et al. | 707/3 |
| 5,954,798 A | 9/1999 | Shelton et al. | 709/224 |
| 5,995,928 A | 11/1999 | Nguyen et al. | 704/251 |
| 6,006,225 A | 12/1999 | Bowman et al. | 707/5 |
| 6,032,162 A | 2/2000 | Burke | 707/501 |
| 6,037,934 A | 3/2000 | Himmel et al. | 345/335 |
| 6,041,360 A | 3/2000 | Himmel et al. | 709/245 |
| 6,067,565 A | 5/2000 | Horvitz | 709/218 |
| 6,096,096 A | 8/2000 | Murphy et al. | 717/11 |
| 6,125,361 A | 9/2000 | Chakrabarti et al. | 707/3 |
| 6,144,958 A | 11/2000 | Ortega et al. | 707/5 |
| 6,199,986 B1 | 3/2001 | Williams et al. | 351/221 |

(Continued)

FOREIGN PATENT DOCUMENTS

EP    1 359 516    11/2003

(Continued)

OTHER PUBLICATIONS

No author, "Partial and Full URL's," Internet, http://maps.fsl.noaa.gov/moniger/web101/1-lecture/partial.html, 2 pages.

(Continued)

*Primary Examiner* — Jay Morrison
(74) *Attorney, Agent, or Firm* — Morgan, Lewis & Bockius LLP

(57) ABSTRACT

In accordance with some embodiments, a server receives a partial search query from a client device that is located remotely from the server, and predicts from the partial search query a set of predicted complete queries relevant to the partial search query, where the predicted complete queries comprise previously submitted complete queries submitted by a community of users. The partial search query and the set of predicted complete queries are in the same language. In addition, the server obtains translations of at least a subset of the set of predicted complete queries, where the translations are in a different language from the set of predicted complete queries, and conveys both the set of predicted complete queries and the corresponding translations to the client device.

42 Claims, 10 Drawing Sheets

U.S. PATENT DOCUMENTS

| | | | |
|---|---|---|---|
| 6,243,071 B1 | 6/2001 | Shwarts et al. | 345/146 |
| 6,278,449 B1 | 8/2001 | Sugiarto et al. | 345/334 |
| 6,281,886 B1 | 8/2001 | Ranieri | 345/173 |
| 6,321,228 B1 | 11/2001 | Crandall et al. | 707/10 |
| 6,324,566 B1 | 11/2001 | Himmel et al. | 709/203 |
| 6,377,965 B1 | 4/2002 | Hachamovitch et al. | 707/534 |
| 6,393,389 B1 | 5/2002 | Chanod et al. | 704/7 |
| 6,411,948 B1 | 6/2002 | Hetherington et al. | 707/2 |
| 6,493,702 B1 | 12/2002 | Adar et al. | 707/3 |
| 6,546,388 B1 | 4/2003 | Edlund et al. | 707/5 |
| 6,546,393 B1 | 4/2003 | Khan | 707/10 |
| 6,564,213 B1 | 5/2003 | Ortega et al. | 707/5 |
| 6,598,051 B1 | 7/2003 | Wiener et al. | 707/100 |
| 6,631,496 B1 | 10/2003 | Li et al. | 715/501.1 |
| 6,647,383 B1 | 11/2003 | August et al. | 707/3 |
| 6,687,689 B1 | 2/2004 | Fung et al. | 707/3 |
| 6,708,250 B2 | 3/2004 | Gillingham | 711/108 |
| 6,832,218 B1 | 12/2004 | Emens et al. | 707/3 |
| 6,956,968 B1 | 10/2005 | O'Dell et al. | 382/182 |
| 7,031,961 B2 | 4/2006 | Pitkow et al. | 707/4 |
| 7,111,000 B2 | 9/2006 | Wen et al. | 707/5 |
| 7,124,129 B2 | 10/2006 | Bowman et al. | 707/5 |
| 7,181,438 B1 | 2/2007 | Szabo | 707/2 |
| 7,188,304 B2 | 3/2007 | Morimoto et al. | 715/501.1 |
| 7,293,231 B1 | 11/2007 | Gunn et al. | 715/531 |
| 7,516,124 B2 * | 4/2009 | Kasperski | 1/1 |
| 7,536,294 B1 * | 5/2009 | Stanz et al. | 704/3 |
| 7,747,639 B2 * | 6/2010 | Kasperski et al. | 707/765 |
| 2002/0023145 A1 | 2/2002 | Orr et al. | 709/219 |
| 2002/0078045 A1 | 6/2002 | Dutta | 707/7 |
| 2002/0174145 A1 | 11/2002 | Duga et al. | 707/513 |
| 2002/0187815 A1 | 12/2002 | Deeds et al. | 455/564 |
| 2003/0011642 A1 * | 1/2003 | Sheng | 345/810 |
| 2003/0023582 A1 | 1/2003 | Bates et al. | 707/3 |
| 2003/0037050 A1 | 2/2003 | Monteverde | 707/6 |
| 2003/0143979 A1 | 7/2003 | Suzuki et al. | 455/406 |
| 2003/0145087 A1 | 7/2003 | Keller et al. | 709/266 |
| 2003/0212563 A1 | 11/2003 | Ju et al. | 704/277 |
| 2004/0010520 A1 | 1/2004 | Tsang et al. | 707/200 |
| 2004/0064577 A1 | 4/2004 | Dahlin et al. | 709/235 |
| 2004/0205501 A1 | 10/2004 | Gupta | 715/501.1 |
| 2005/0060310 A1 * | 3/2005 | Tong et al. | 707/7 |
| 2005/0080771 A1 | 4/2005 | Fish | 707/3 |
| 2005/0149507 A1 | 7/2005 | Nye | 707/3 |
| 2005/0203878 A1 | 9/2005 | Brill et al. | 707/3 |
| 2005/0246211 A1 | 11/2005 | Kaiser | 705/7 |
| 2005/0283468 A1 | 12/2005 | Kamvar et al. | 707/3 |
| 2006/0106769 A1 | 5/2006 | Gibbs | 707/3 |
| 2006/0173829 A1 * | 8/2006 | Neeman | 707/3 |
| 2006/0224871 A1 | 10/2006 | Tran | 712/239 |
| 2006/0259479 A1 | 11/2006 | Dai | 707/4 |
| 2007/0050339 A1 * | 3/2007 | Kasperski et al. | 707/3 |
| 2007/0050351 A1 * | 3/2007 | Kasperski et al. | 707/4 |
| 2007/0050352 A1 | 3/2007 | Kim | 707/4 |
| 2007/0143262 A1 * | 6/2007 | Kasperski | 707/3 |
| 2007/0156677 A1 | 7/2007 | Szabo | 707/5 |
| 2008/0016034 A1 * | 1/2008 | Guha et al. | 707/3 |
| 2008/0040323 A1 | 2/2008 | Joshi | 707/3 |
| 2008/0065617 A1 * | 3/2008 | Burke et al. | 707/5 |
| 2008/0201227 A1 | 8/2008 | Bakewell et al. | 705/14 |
| 2009/0024613 A1 * | 1/2009 | Niu et al. | 707/5 |
| 2009/0043741 A1 * | 2/2009 | Kim | 707/3 |
| 2009/0070301 A1 * | 3/2009 | McLean et al. | 707/3 |

FOREIGN PATENT DOCUMENTS

WO   WO 2005/033967   4/2005

OTHER PUBLICATIONS

Choi, Y., "Dictionary Suggest," https://docs.google.com/a/google.com/View?docid=d25zkhp_78fqv2t7gk.., May 13, 2008, pp. 1-7.

International Search Report for International Application PCT/US2009/048668, mailed Jan. 27, 2010, 12 pages.

International Search Report for International Application No. PCT/US2005/036553, mailed May 11, 2006, 4 pages.

Office Action dated Jun. 5, 2009 for U.S. Appl. No. 10/987,769, 33 pages.

* cited by examiner

DICTIONARY SUGGESTIONS FOR PARTIAL USER ENTRIES

TECHNICAL FIELD

The disclosed embodiments relate generally to online automated dictionary services.

BACKGROUND

Online dictionary services include web-based services for translating individual words or terms from one language to another. To obtain a translation, the user enters a complete word or term in one language to receive a translation, definition, or other information in the other language.

SUMMARY

In accordance with some embodiments described below, a method for processing query information, performed at a server, includes receiving a partial search query from a client device that is located remotely from the server. The method further includes predicting from the partial search query a set of predicted complete queries relevant to the partial search query, where the predicted complete queries comprise previously submitted complete queries submitted by a community of users. The partial search query and the set of predicted complete queries are in the same language. In addition, the method includes obtaining translations of at least a subset of the set of predicted complete queries, where the translations are in a different language from the set of predicted complete queries, and conveying both the set of predicted complete queries and the corresponding translations to the client device.

In accordance with some embodiments a method performed at a client includes receiving from a search requester a partial search query, and obtaining, from a server that is remote from the client, a set of predicted complete queries relevant to the partial search query and translations of at least a subset of the set of predicted complete queries. The predicted complete queries comprise previously submitted complete queries submitted by a community of users and the translations are in a different language from the set of predicted complete queries. The method also includes displaying two or more complete queries from the set of predicted complete queries and displaying at least portions of the translations of the two or more complete queries.

In some embodiments a server system for processing query information includes one or more processors and memory to store data and one or more programs to be executed by the one or more processors. The one or more programs including instructions for receiving from a search requester a partial search query, the search requestor located remotely from the server, and for predicting from the partial search query a set of predicted complete queries relevant to the partial search query, where the predicted complete queries comprise previously submitted complete queries submitted by a community of users. The one or more programs further include instructions for obtaining translations of at least a subset of the set of predicted complete queries, wherein the translations are in a different language from the set of predicted complete queries, instructions for conveying both the set of predicted complete queries and the corresponding translations to the search requestor.

In some embodiments a client system for processing query information includes one or more processors and memory to store data and one or more programs to be executed by the one or more processors. The one or more programs include instructions for receiving from a search requester a partial search query, and obtaining, from a server that is remote from the client, a set of predicted complete queries relevant to the partial search query and translations of at least a subset of the set of predicted complete queries. The predicted complete queries comprise previously submitted complete queries submitted by a community of users and the translations are in a different language from the set of predicted complete queries. The one or more programs also include instructions for displaying two or more complete queries from the set of predicted complete queries and displaying at least portions of the translations of the two or more complete queries.

DESCRIPTION OF EMBODIMENTS

Figure 1:
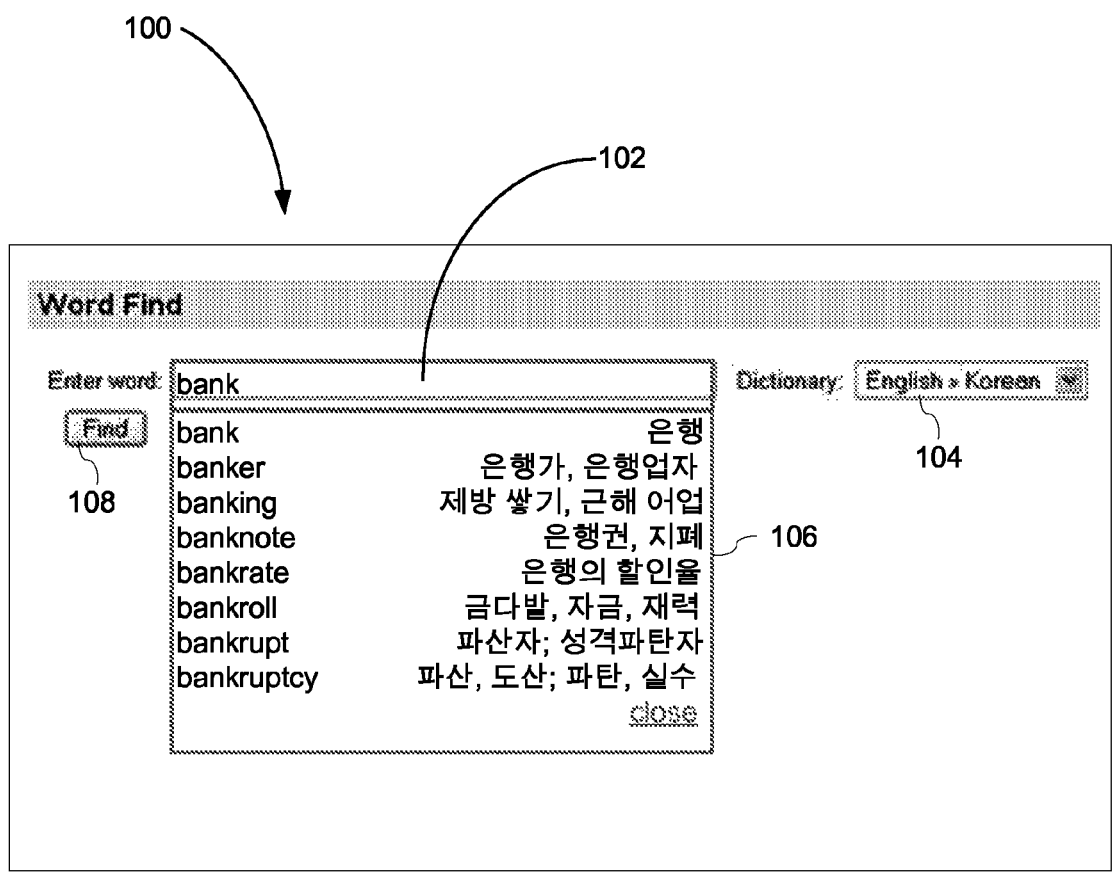
FIG. 1 depicts an exemplary screen shot in accordance with some embodiments.

FIG. 1 illustrates an example of a web page 100, as displayed on a client device. The web page, which may be associated with an online dictionary service, includes a text entry box 102 depicting the entry of a partial search query of "bank". In this illustration, a user has selected from a pull-down menu 104 a pair of languages indicating that the user is seeking translation of a word or term in a first language into a second language. In response to detecting the partial search query, the client system obtains a set of predicted complete queries from a server and displays the predicted complete queries in a display area of the web page for possible selection by the user. As depicted, the complete predictions are presented in a drop-down box 106 that extends from the text entry box 102. Note that the partial query "bank" generates predicted complete queries, such as <bank>, <banker>, and <banking>, as well as their Korean translations. If one of the predictions matches the user's intended (but not yet fully entered) query, then the user can select a respective predicted query from the drop down box 106, for example by "clicking" on (or scrolling to or highlighting) that predicted query. If the user selects a predicted query or finishes typing the complete query, the user may press the "Find" button 108 or click on the predicted query to obtain further information from a dictionary. For example, the complete query may be a word or term for which the user is requesting a translation, and the obtained information includes a translation and optionally includes additional information, such as examples of use of the word or term in various contexts. Alternatively, the user may modify the partial query, input more characters to the partial query, or terminate the query.

In some embodiments, the predicted complete queries each begin with the same letters or symbols as the partial query. However, in some other embodiments, if a potential misspelling has been identified (e.g., by a server), one or more of the predicted complete queries may begin with the letters or symbols of a suggested spelling correction. Alternately, in some embodiments the predicted complete queries each include a component (e.g., a word or syllable) that begins with the same letters or symbols as the partial query or a suggested spelling correction of the partial query.

Figure 2:
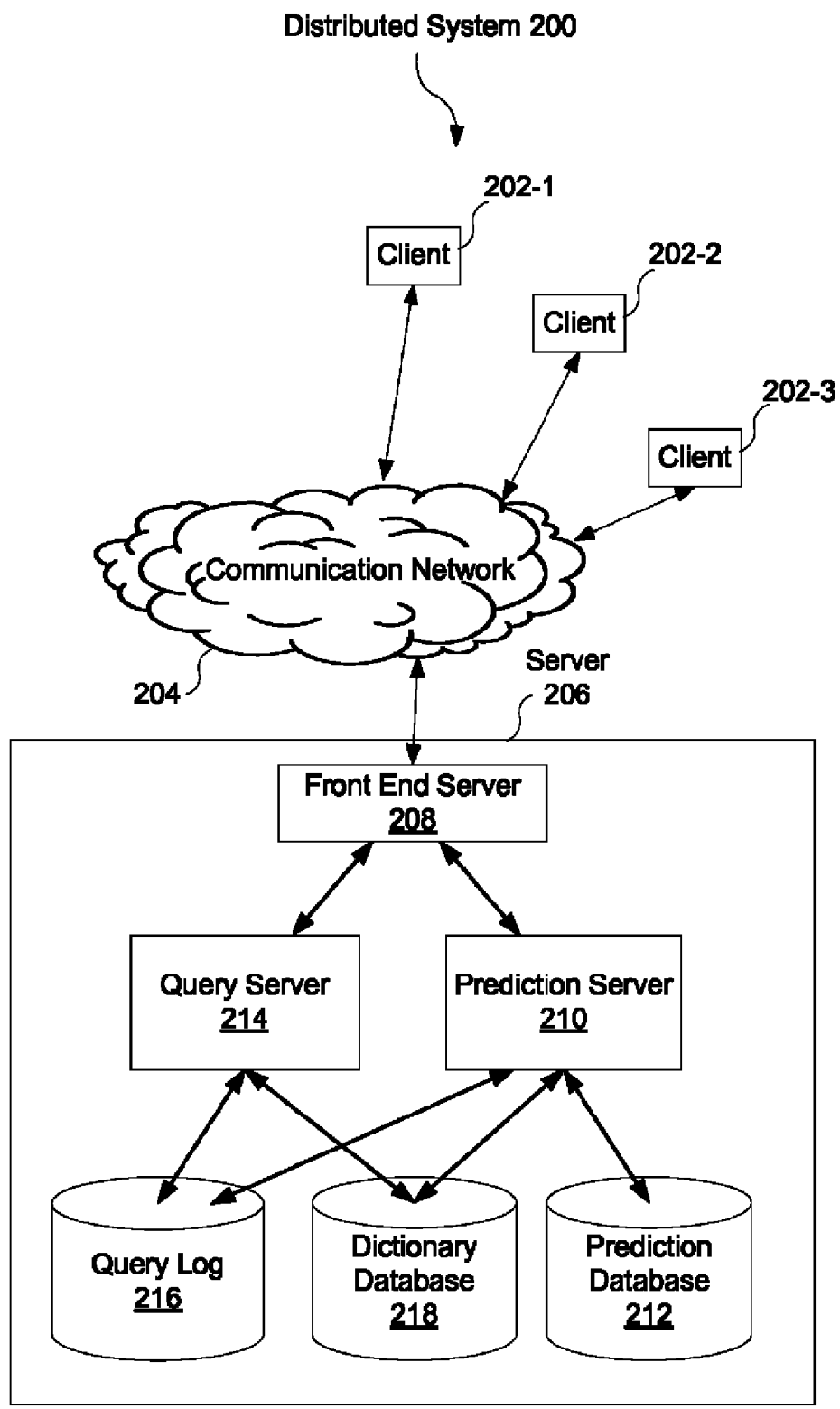
FIG. 2 depicts a block diagram of a query processing system in accordance with some embodiments.

FIG. 2 illustrates a distributed system 200, suitable for practice of embodiments of the invention. The distributed system 200 may include one or more client systems 202 connected to a server 206 by a communication network 204. Each client system 202 has a prediction assistant (described below with reference to FIGS. 5A, 5B and 6). A respective client system 202, sometimes called a client or client device, may be a desktop computer, laptop computer, kiosk, cell phone, personal digital assistant, or the like. The communication network 204 may include one or more communication networks, such as the Internet, other wide area networks, local area networks, metropolitan area networks, and so on. The server 206 optionally includes a front end server 208 that forwards user requests, such as complete search queries and partial search queries, to appropriate portions or services within the server 206. In some embodiments, the server 206, which may be a system that includes multiple servers, includes a prediction server 210, for processing partial search queries. A query server 214, for processing complete search queries, is optionally included in the server 206. In the embodiment shown, the prediction server 210 accesses query prediction information in a prediction database 212, while the query server 214 accesses translations and optionally additional information from a dictionary database 218. In some embodiments, the prediction server 210 and the query server 214 are distinct servers, for example at distinct locations and/or having distinct URLs or IP addresses, while in other embodiments the prediction server 210 and the query server 214 are either the same server or located within the same server system.

An optional query log 216 stores information about search queries submitted by a community of users. In some embodiments, the query log 216 stores complete search queries submitted to the server 206, while in other embodiments it stores search queries submitted to one or more other services, such as an Internet search engine. As described in more detail below, the prediction database 212 may be generated based on information in the query log 216 and a dictionary database, which may or may not be the same dictionary database 218 used by the query server 214.

Figure 3:
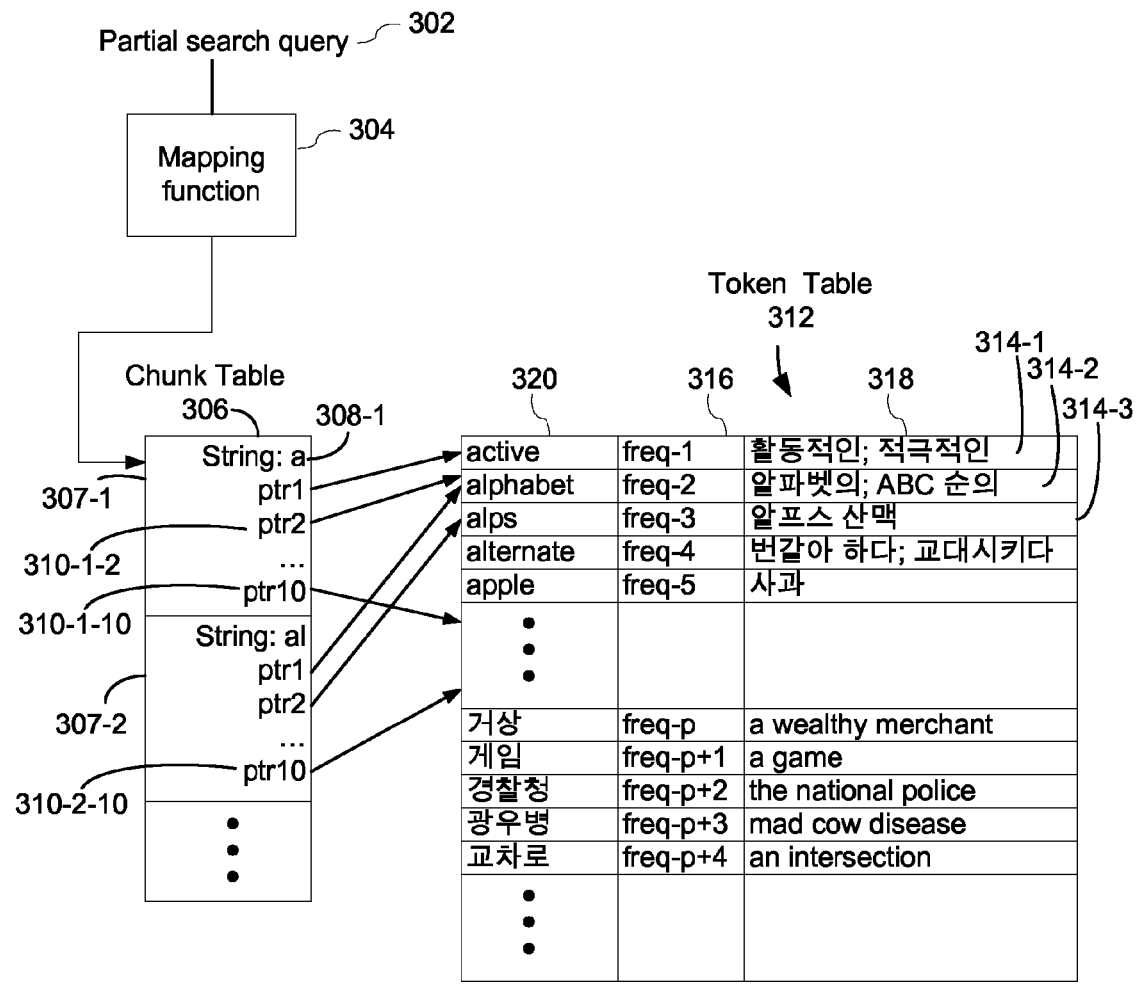
FIG. 3 illustrates the data structure associated with processing of query information, in accordance with some embodiments.

FIG. 3 illustrates a mapping function and data structures for processing partial search queries, in accordance with some embodiments of the present invention. A partial search query 302 received from a respective user is processed by a mapping function 304. The mapping function 304 identifies, within a chunk table 306, an entry 307 that matches the partial search query 302. For example, the mapping function 304 and chunk table 306 may be implemented using a hash function and hash table; however, other implementations may be used as well. Each entry 307 of the chunk table 306 is associated with a text string that is a potential partial search query that may be received from a user. A respective entry 307 in the chunk table contains, for a respective partial search query, one or more pointers 310 to entries 314 in a token table 312 for complete query terms 320. Optionally, each entry 307 of the chunk table contains a text string 308 or other value (e.g., a fixed-length CRC value) for verifying a match between the user specified partial search query and the chunk table entry identified by the mapping function 304.

As illustrated, a pointer 310-1-2 in a respective chunk table entry 307-1 is associated with a string 308-1 (or other value representing a string) and points to an entry 314-2 in the token table 312. Furthermore, in many embodiments, multiple entries 307 in the chunk table 306 include pointers 310 to the same entry 314 in the token table. For example, entries in the chunk table for <b>, <ba> and <ban> each contain a pointer to the token table entry 314 for the complete query term <bank>.

Each entry 314 in the token table 312 specifies a complete query term 320 and a short translation 318 of the complete search query. In some embodiments, each entry 314 also includes a frequency 316 or other value associated with the complete query term. The frequency or other value 316, if included, may represent a weight, importance or popularity of the complete query term. Within a respective entry 314, the complete query term 320 is in a different language from the short translation 318. In some embodiments, a single token table 312 may contain entries 314 that translate terms in a first language (e.g., English) into a second language (e.g., Korean) as well as other entries 314 that translate terms in the second language into the first language. This is particularly practical where words in the two languages are encoded distinctly (e.g., using standard Unicode encoding). In some embodiments, the server 206 or prediction server 210 (FIG. 2) used for generating predicted complete search queries and definitions include multiple chunk tables and token tables, each for providing prediction information relating to a particular pair of languages.

Figure 4:
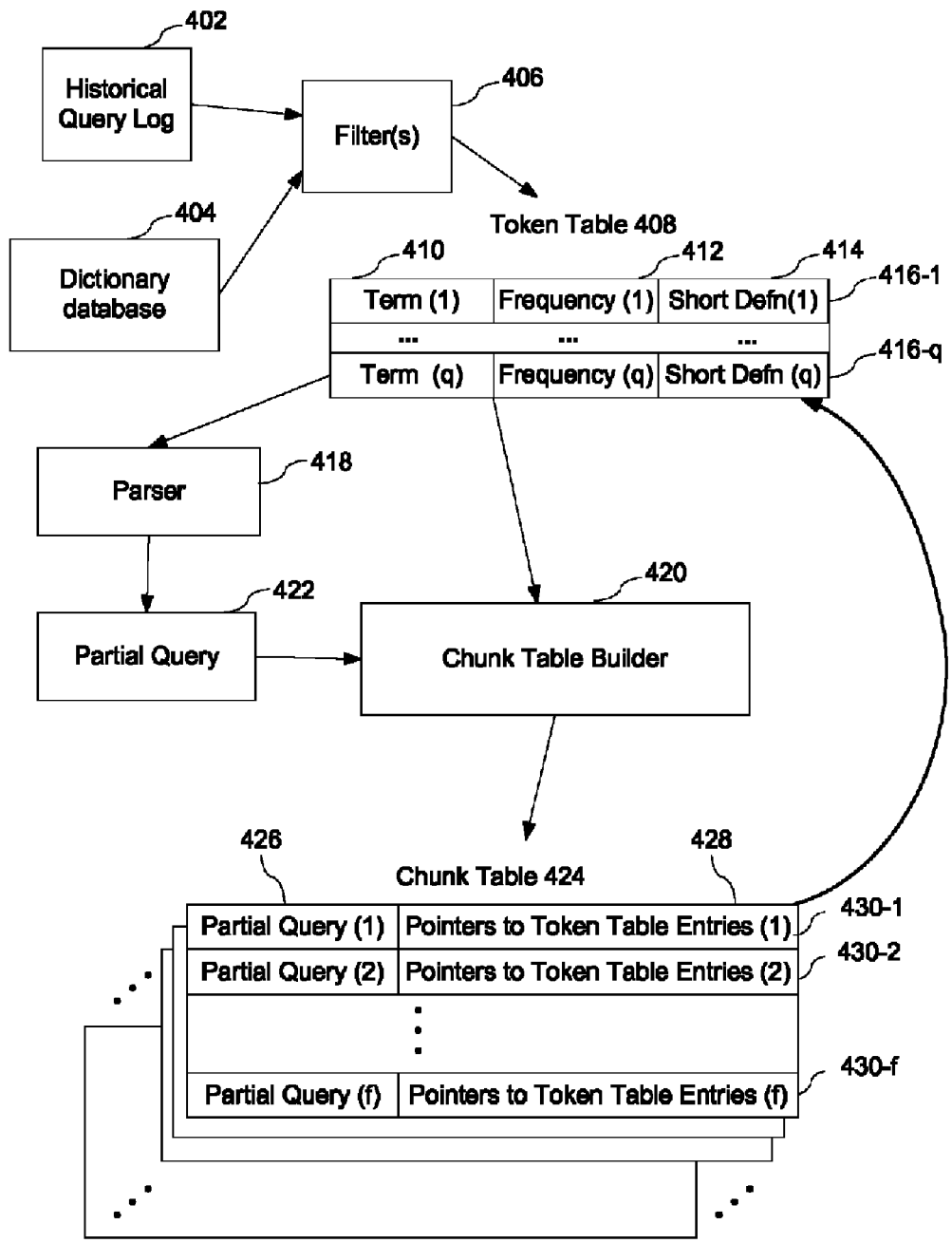
FIG. 4 depicts a conceptual block diagram of a database builder in accordance with some embodiments.

FIG. 4 depicts a conceptual block diagram that shows how a database builder builds the chunk table and token table of FIG. 3, in accordance with some embodiments. Historical query log 402 contains queries submitted by a community of users. The queries may be queries for looking up translations of those queries, or they may be queries submitted to an Internet search engine or other online service(s). Dictionary database 404 contains terms and their translations. Contents of the historical query log 402 and the dictionary database 404 are processed by a filter 406 to create a token table 408. The filter removes queries (from the log 402) that do not have matching entries in the dictionary database 404. The filter 406 may further remove queries matching a set of predefined terms, such as words that may be considered to be objectionable, even though they are included in the dictionary database. The filtered queries become terms 410 (also called complete search queries) in the token table 408. The token table 408 also includes a short definition of each term 410, and optionally includes a frequency or weight 412 for each term 410. The frequency 412 is derived from the historical query log 402. For example, the frequency 412 for a respective term 410 may be computed as a count or normalized count of the number of historical queries that include the term 410. As noted, the frequency 412 may be normalized so that all frequency values in the token table 408 fall within a predefined range, such as 0 to 1, or 0 to $2^N-1$, or 0 to M, where N is an positive integer and M is a positive value.

In some alternate embodiments, the filter 406 creates a token table 408 with the contents of the dictionary database 404, without access to the historical query log 402. In such a case, the token table 408 may contain the terms from the entire dictionary database or a subset of terms in the dictionary database.

The short definition 414 in a respective token table entry 416 is copied from or derived from the dictionary database 404; for example, the short definition 414 may be extracted from the first definition of the term 410 in the dictionary database 404. Alternately, the short definition 414 may be derived from information in the dictionary database 404 in accordance with a set of rules whose goal is to extract the most meaningful portion of a definition that can be presented in just a few words. Typically, the term 410 is in a first language (e.g., English) and the short definition 414 is a translation of the term 410 in a second language (e.g., Korean). In this context, the "translation" of the term 410 can be either a conventional translation, or it can be an explanation of the term in the second language. For some terms, as discussed below, the short definition 414 is (or includes) a synonym or completion of the corresponding term 410 in the same language as the corresponding term 410.

In some embodiments, when a respective term 410 in the token table is an abbreviation or shortened term, the corresponding short definition 414 (in the token table 408) includes a completion or synonym of the abbreviation or shortened term, in addition to or instead of translations. For example, the short definition 414 can be "United States of America" for an entry in which the term 410 is "USA;" other examples are "etcetera" for the term "etc." and "for example" for the term "e.g." In some embodiments, the completions (also called "spelled out terms") and/or synonyms are copied from or derived from the dictionary database 404. In some other embodiments, the completions and/or synonyms are separately inserted from a different dictionary or a database. In these special cases (e.g., synonyms or completions), the synonym or completion is in the same language as the corresponding predicted complete query.

The terms 410 in the token table 408 are further processed by a parser 418 and a chunk table builder 420. The parser 418 takes each term 410 from the token table 408 and parses the term into partial queries 422. In some embodiments, the partial queries 422 are strings corresponding to the initial one or more characters of the terms 410. For example, a parser may generate partial queries <b>, <ba>, <ban>, and <bank> from a term "bank". In another example, a parser may generate partial queries <b>, <ba>, <bat>, and <bath> from a term "bath".

The chunk table builder 420 builds a chunk table 424 based on the partial queries 422 and the token table 408. The chunk table 424 contains partial queries 426 and pointers 428 to token table entries associated with the partial queries 426. For example, a chunk table entry for the partial query <ba> may have pointers to token table entries for the complete query terms <bank> and <bath>. The chunk table 424 may be structured into one or more tables to facilitate access to partial queries 426 and/or pointers 428 to token table entries. In some other embodiments, the partial queries 422 include, in addition or alternatively, sequences of characters that begin at the syllable boundaries of two or more distinct syllables in multi-syllable terms 410. For example, for the term "database" the partial queries in the chunk table 424 may include <b>, <ba>, <bas>, etc. as well <d>, <da>, <dat>, and so on.

In some embodiments, the chunk table builder 420 includes in the chunk table 424 a representation of a partial search query in a second language when the partial search query is intended to be in a first language. For example, when a user intends to enter a search query, "모바일" which means "mobile" in Korean, if the user incorrectly uses an English input method, the user's typing will lead to a Romanized search query, "ahqkdlf" which corresponds to the keyboard strokes that would have generated the Korean search query if typed in an Korean input method. The chunk table builder 420 may add a search query "ahqkdlf" and its partial search queries (in addition to the Korean search query and its partial search queries) to the chunk table 424. Each of these additional entries includes a pointer 428 to an entry 416 in the token table token 408 corresponding to the Korean term "모바일".

The conversion of a Korean character string in a query into a Romanized representation can be accomplished by calculating an index for each consonant or vowel forming a constituent of each syllabic block character. For Korean characters represented in Unicode, the characters are arranged as:

Unicode=(initial consonant*21*28)+(middle vowel*28)+optional ending+0xAC00

Figure 5A:
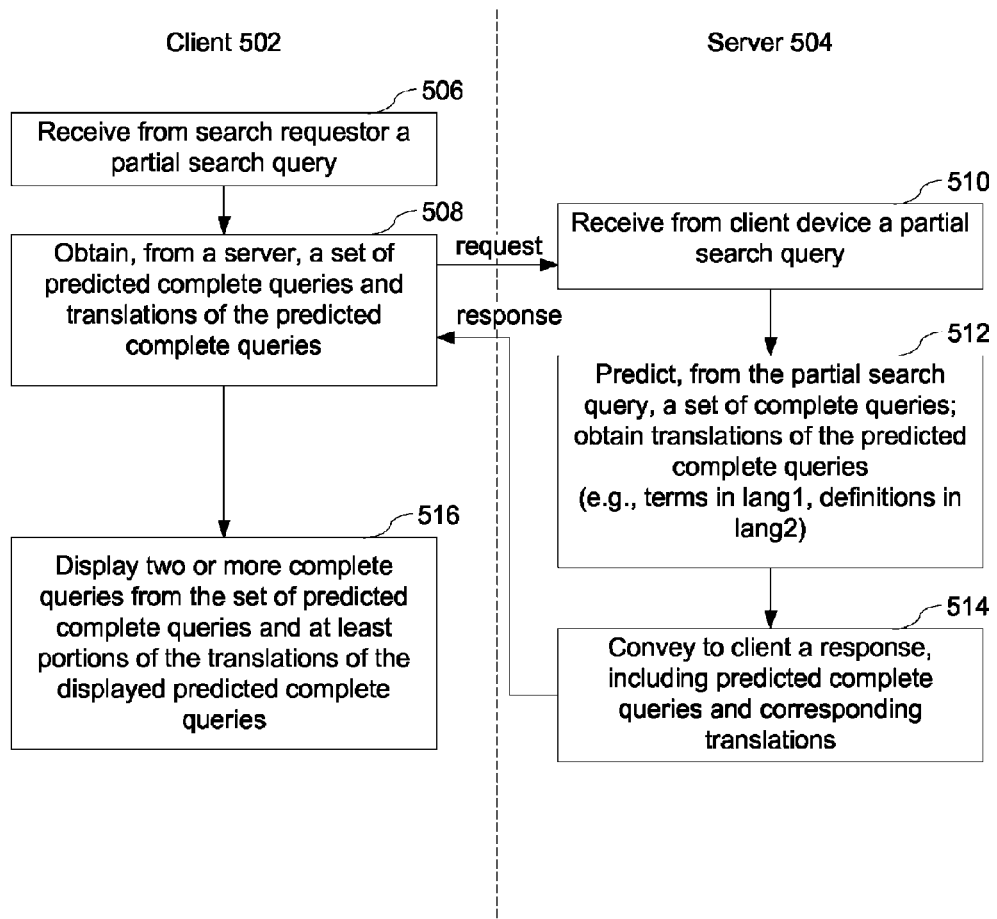
FIG. 5A depicts the process of handling a partial search query and displaying predicted queries in accordance with some embodiments.

FIG. 5A depicts a process of handling a partial search query and obtaining predicted complete queries, in accordance with some embodiments including a client system 502 and a server 504. Additional details and embodiments of this process are discussed below with reference to FIGS. 5A, 6 and 7. The process starts when a client receives a partial search query from a user (also called a search requester) (506). The partial search query may be one or more characters, or one or more words. The client obtains from a server a set of predicted complete queries and translations of the predicted complete queries (508). This may be accomplished by making a request to the server and receiving a response from the server. The request includes the partial search query from the user. When the server receives the partial search query from the client (510), the server predicts, from the partial search query, a set of complete queries (512). In some embodiments, the prediction is made by mapping the partial search query to an entry in a chunk table, as described with reference to FIG. 3. The server also obtains translations of at least a subset of the predicted complete queries, where the predicted completed queries are in a first language, and the translations (also called definitions or short definitions) are in a second language (512). The server conveys to the client a response which includes the predicted complete queries and corresponding translations (514). The client receives the response as described above. Subsequently, the client displays two or more complete queries from the set of predicted complete queries and at least a portion of the translations of the displayed predicted complete queries (516). As discussed in more detail elsewhere, the received prediction data for one or more of the predicted complete queries may include a short definition other than a translation of the corresponding complete query.

As discussed above, in some embodiments, when the predicted complete queries include an abbreviation or shortened term, the information returned to the client optionally includes a completion or synonym of the predicted complete query, either in addition to or instead of a translation of the predicted complete query.

In some embodiments, the client may display the entire set of predicted complete queries as obtained from the server. In some other embodiments, the client displays two or more complete queries selected based on predefined criteria, including factors such as the screen size or window size of an Internet browser window and/or the number of complete queries to display set by the user or by default.

In some embodiments, the client displays the translations obtained from the server. In some other embodiments, the client displays portions of the translations. The portions are selected based on another predefined criteria, including one or more factors such as the screen size or window size of an Internet browser window and the string length of the translations. In some embodiments, the client displays synonyms or spelled out terms, in addition to or instead of translations, if any synonyms or spelled out terms are included in the information returned by the server.

Figure 5B:
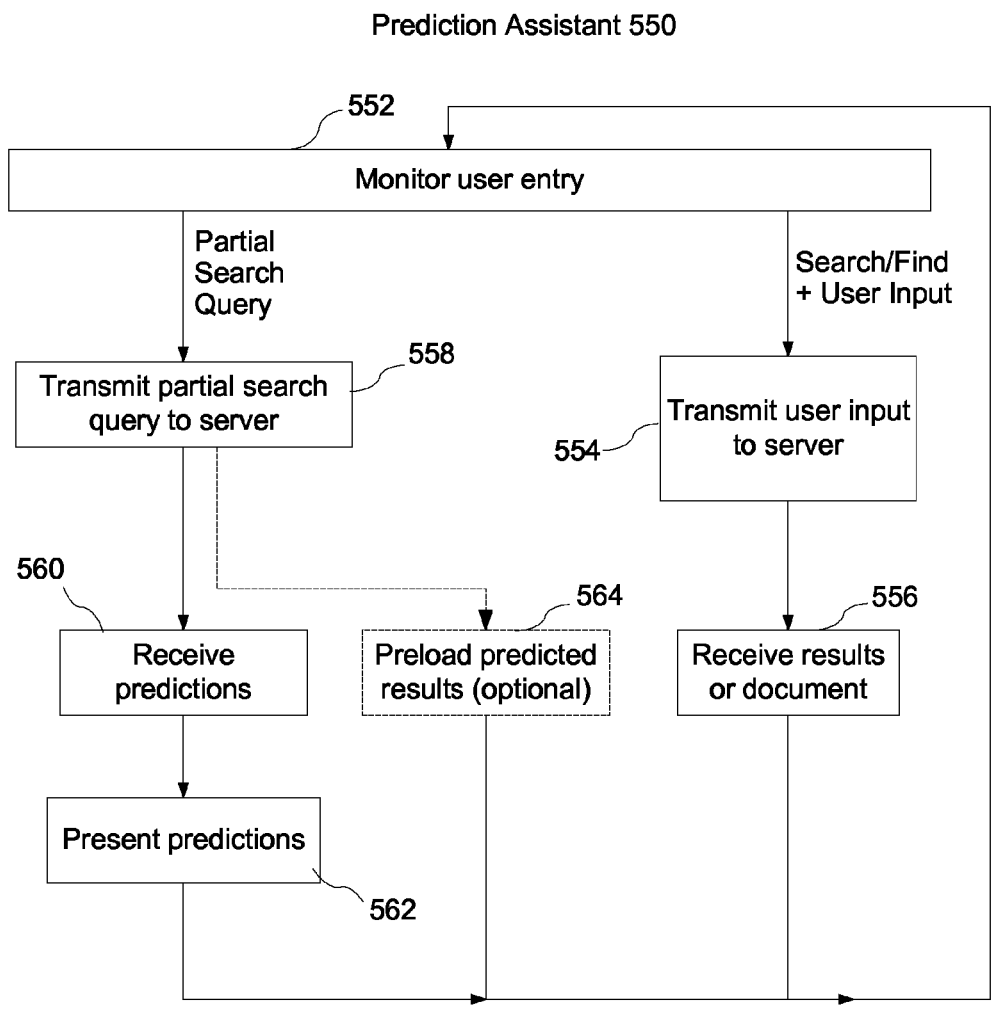
FIG. 5B depicts a process in a prediction assistant in accordance with some embodiments.

FIG. 5B illustrates an embodiment that may be implemented in the prediction assistant 550 of a client system 202. A prediction assistant 550 monitors the user's entry of a search query into a text entry box on a client system (552). The user's entry may be one or more characters, or one or more words (e.g., the first word or two of a phrase, or a first word and the beginning letter, characters or symbols of a new word of a phrase of a compound term). The prediction assistant 550 may identify two different types of queries. First, the prediction assistant 550 receives or identifies a partial search query when an entry is identified prior to when the user indicates completion of the input string (as described below). Second, the prediction assistant 550 receives or identifies a user input when the user has selected a presented prediction, or indicated completion of the input string.

When a user input or selection is identified as a completed user input, the completed user input is transmitted to a server for processing (554). The server returns a set of search results, which is received by the prediction assistant 550 or by a client application, such as a browser application (556). In some embodiments, the browser application displays the search results at least as part of a web page. In some other embodiments, the prediction assistant 550 displays the search results. Alternately, the transmission of a completed user input 554 and the receipt 556 of search results may be performed by a mechanism other than a prediction assistant 550. For example, these operations may be performed by a browser application using standard request and response protocols.

A user input may be identified by the prediction assistant 550 (or by a browser or other application) as a completed user input, in a number of ways such as when the user enters a carriage return, or equivalent character, selects a "find" or "search" button in a graphical user interface (GUI) presented to the user during entry of the search query, or by selecting one of a set of predicted queries presented to the user during entry of the search query. One of ordinary skill in the art will recognize a number of ways to signal the final entry of the search query.

Prior to the user signaling a completed user input, a partial search query may be identified. For example, a partial search query is identified by detecting entry or deletion of characters in a text entry box. Once a partial search query is identified, the partial search query is transmitted to the server (558). In response to the partial search query, the server returns predictions, including predicted complete search queries and translations of at least a subset of the predicted complete search queries. The prediction assistant 550 receives (560) and presents (e.g., displays, verbalizes, etc.) the predictions (562).

After the predicted queries and translations are presented to the user (562), the user may select one of the predicted complete search queries if the user determines that one of the predictions matches the intended entry. In some instances, the predictions may provide the user with additional information which had not been considered. For example, a user may have one query in mind as part of a search strategy, but seeing the predicted results causes the user to alter the input strategy. Once the set is presented (562), the user's input is again monitored. If the user selects one of the predictions, the user input is transmitted to the server (554) as a complete query (also herein called a completed user input). After the request is transmitted, the user's input activities are again monitored (552).

In some embodiments, the prediction assistant 550 may preload additional predicted results from the server (564). The preloaded predicted results may be used to improve the speed of response to user entries. For example, when the user enters <ban>, the prediction assistant 550 may preload the prediction results for <bana>, . . . , and <bank>, in addition to the prediction results for <ban>. If the user enters one more character, for example <k>, to make the (partial search query) entry <bank>, the prediction results for <bank> can be displayed without transmitting the partial search query to the server or receiving predictions.

In some embodiments, one or more sets of predicted results are cached locally at the client. When the search requester modifies the current query to reflect an earlier partial input (e.g., by backspacing to remove some characters), the set of predicted results associated with the earlier partial input is retrieved from the client cache and again presented again to the user instead of the partial input being sent to the server.

After receiving the results or document for a final input (556), or after displaying the predicted complete search queries (562), and optionally preloading predicted results (564), the prediction assistant 550 continues to monitor the user entry (552) until the user terminates the prediction assistant 550, for example by closing a web page that contains the prediction assistant 550.

Figure 6:
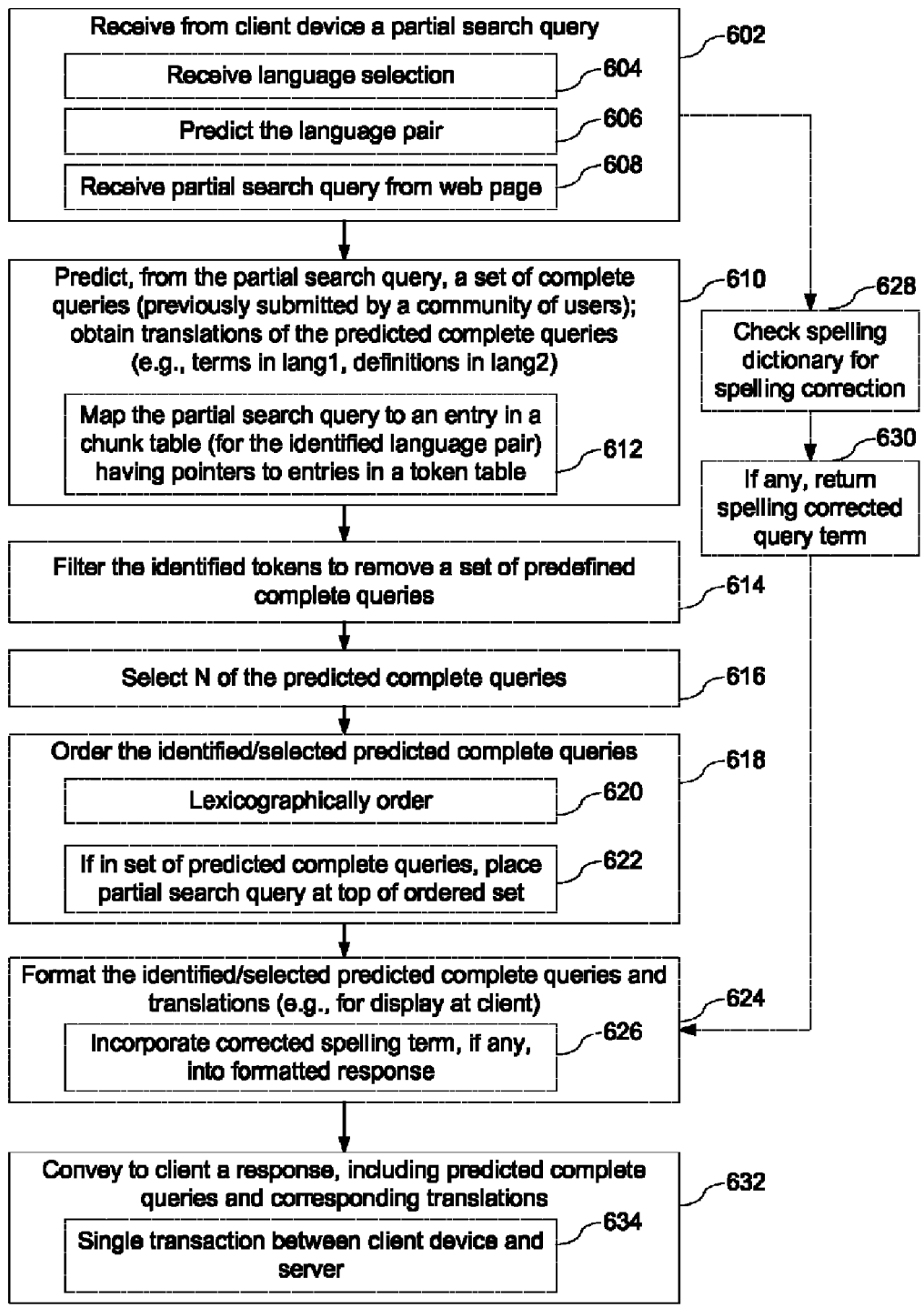
FIG. 6 illustrates the processing of a partial search query at a server in accordance with some embodiments.

FIG. 6 illustrates a method or process for processing a partial search query at a server in accordance with some embodiments. The process at the server starts when the server receives a partial search query from a client device (602). In some embodiments, the server receives the partial search query from a web page on the client device (608).

Prior to receiving a respective partial search query, the server identifies a pair of languages, for use when returning a result that includes a word or term in a first language and a translation of that word or term into a second language. In some embodiments, the server may receive from the client a language pair selected by the user (604). In some other embodiments, the server may predict the language pair, for example, based on multiple factors, such as the Unicode of the partial search query, the Internet protocol (IP) address of the client, and/or statistics based on search queries submitted by a community of users.

After receiving the partial search query, the server predicts, from the partial search query, a set of complete queries (610). In some embodiments, the set of predicted complete queries include a plurality of distinct terms. In some other embodiments, all of the predicted complete queries are different from each other. In some embodiments, the predictions are based on complete queries previously submitted by a community of users. The queries may be queries for looking up translations of those queries, or they may be queries submitted to an Internet search engine or other online services.

In some embodiments, the prediction includes, in addition to obtaining a set of complete queries for the partial search query, converting the partial search query in a first language to a representation in the second language (e.g., by treating the user's keystrokes as if they had be used to enter a partial query in the second language), and obtaining a set of complete queries for the converted partial search query.

In some embodiments, the predictions are made by mapping the partial search query to an entry in a chunk table (612). The chunk table may be structured, including pointers to entries in a token table, as described with reference to FIG. 3.

In some embodiments, a distinct chunk table is used for each language pair for mapping partial search queries to predicted complete search queries.

For at least a subset of the respective predicted complete queries, the server obtains corresponding translations (610). The translations may be obtained from a prediction database 212, a dictionary database 218, a token table 312, or any other dictionary database by looking up entries that match respective predicted complete queries. As discussed above, in some embodiments, when a respective predicted complete query is an abbreviation or shortened term, the information returned to the client optionally includes a completion or synonym of the respective predicted complete query, either in addition to or instead of a translation of the respective predicted complete query. Thus, for such terms, the prediction data includes a short definition, which comprises a completion or synonym of the term, or both (A) a completion/synonym in the same language as the term and (B) a translation or other explanation of the term in a second language.

In some embodiments, the predicted complete queries are filtered to remove any queries that match set of predefined terms, such as words that may be considered to be objectionable (614). Stated in another way, the set of predicted complete queries are filtered to remove any predicted complete queries that are members of a set of predefined queries.

In some embodiments, a subset of queries is selected from the predicted complete queries, where the number of queries in the subset is a predefined number, N (616). The selection may be made based on predefined criteria, such as a lexicographical order (sometimes called alphabetical order), the frequency of submission of each of the predicted complete queries by a community of users, the order of entry of the complete queries in a database, and the predefined number, N.

In some embodiments, the identified (or selected) predicted complete queries are ordered (618) by the server. In some embodiments, the ordering (618) re-orders the predicted complete queries in lexicographical order (620). In some embodiments, the predicted search queries are ordered in accordance with the frequency of submission of the predicted complete queries by a community of users. In some embodiments, the search queries are ordered, at least in part, in accordance with a last time/date value that the query was submitted. In some embodiments, the search queries are ordered in accordance with personalization information, such as user personalization information or community information. For instance, user personalization information may include information about subjects, concepts and/or categories of information that are of interest to the user. The user personalization information may be provided directly by the user, or may be inferred with the user's permission from the user's prior search or browsing activities, or may be based at least in part on information about a group associated with the user or to which the user belongs (e.g., as a member, or as an employee). The set of predicted search queries may be initially ordered in accordance with a first ranking criteria, such as predefined popularity criteria, and then reordered if any of the predicted search queries match the user personalization information of the user so as to place the matching predicted search queries at or closer to the top of the ordered set of predicted search queries. In some embodiments, when the partial search query matches an entry of the set of predicted complete queries, the partial search query can be placed at the top or in a predefined first place of the ordered predicted complete queries (622).

In some embodiments, the server formats a response, including the identified (or selected) predicted complete queries and the corresponding translations (624). In some embodiments, the server will also incorporate a spelling corrected term into the response, if a spelling corrected term is provided (626).

In some embodiments, a spelling corrected term is provided if the server (or another server that performs spell checking) determines that the user input may include a spelling error. The spelling correction can be generated in many ways. For example, the partial search query can be checked against entries in a spelling dictionary, which contains misspelled search queries and corresponding search queries with correct spelling (628). In another example, spelling correction may be suggested based on the similarity and dissimilarity between the partial search query and the closest matching complete search query. Regardless of the method to generate spelling corrections, if there is a spelling correction, the spelling correction is returned (630).

The server will convey to the client the response, which includes predicted complete queries and corresponding translations (632). In some embodiments, receiving a partial search query (and language pair selection) from the client and conveying the response is completed in a single transaction between the client and the server (634). For example, the single transaction may comprises a single HTTP request and single response to the HTTP request.

Figure 7:
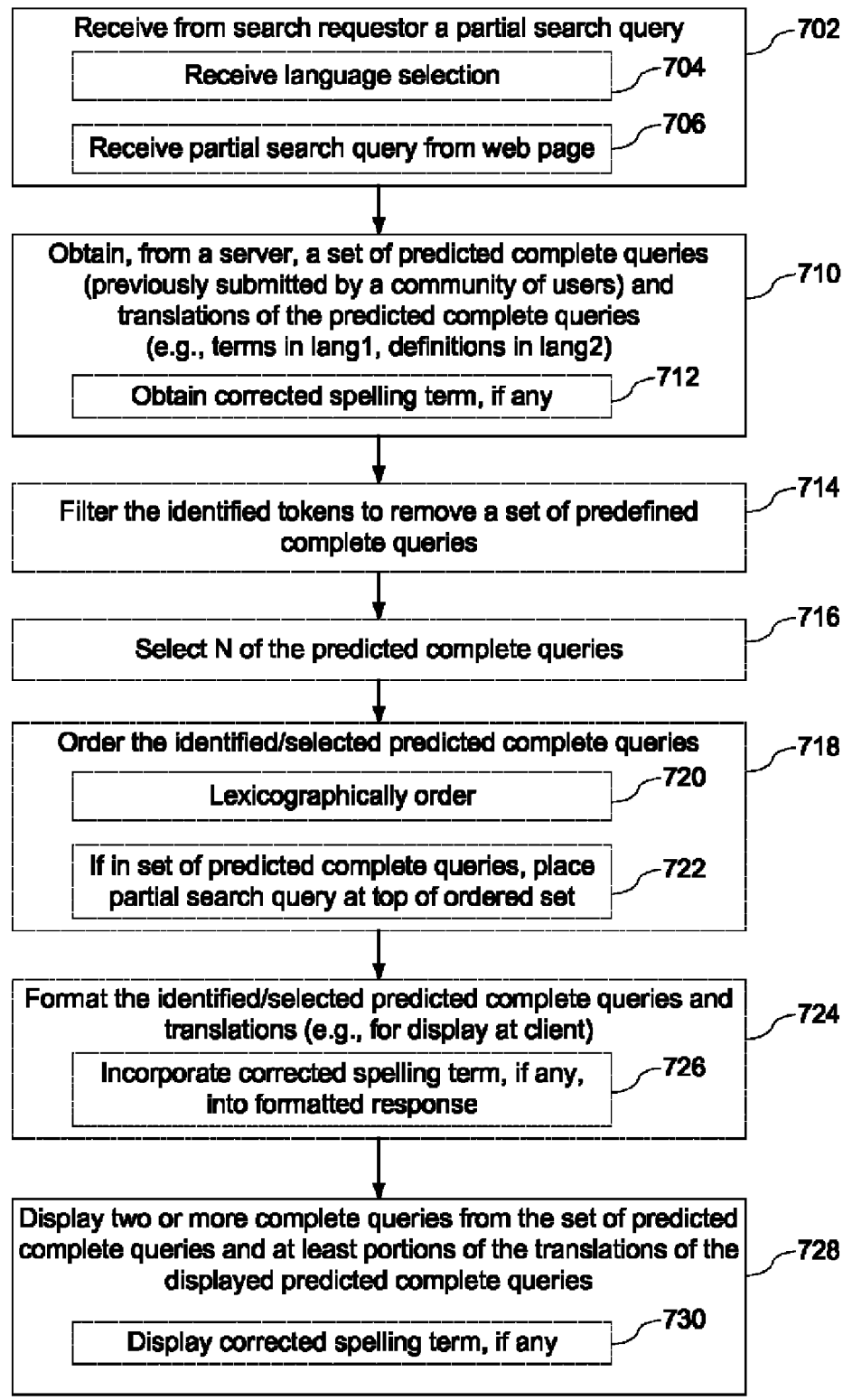
FIG. 7 illustrates the processing of a partial search query at a client in accordance with some embodiments.

FIG. 7 illustrates the processing of a partial search query at a client in accordance with some embodiments. The process at the client starts when the client receives a partial search query from a search requester (702). In some embodiments, the client receives the partial search query from a web page on the client (706).

In some embodiments, a user may select a language pair, indicating that the user is seeking translation of a word or term in a first language into a second language (704). In some embodiments, the user's previous selection of the language pair or the language pair predicted by the server may be stored locally, for example in a cache or a cookie. Upon receiving a partial search query from the user, the client may look up the language pair used previously and transmit the language pair information as part of the transaction with the server.

Then the client obtains, from a server, a set of predicted complete queries and translations of the predicted complete queries (710). To accomplish this, the client may transmit a request and receive a response, as described with reference to FIG. 5B. In some embodiments, the predictions are based on complete queries previously submitted by a community of users. The queries may be queries for looking up translations of those queries, or they may be queries submitted to an Internet search engine or other online services. In some embodiments, the client may obtain a spelling corrected term as part of the response (712).

In some embodiments, the predicted complete queries are filtered at the client to remove any queries that match a set of predefined terms (714). The set of predefined terms may be words that may be considered to be objectionable, or words set by a user or provided by other applications, such as parental control applications. As noted above, in some embodiments the predicted complete queries are filtered at the server to remove objectionable terms, in which case the filtering at the client, if performed, is in addition to the filtering at the server. For example, the client may implement more stringent filtering than the filtering (if any) performed by the server.

In some embodiments, a subset of queries is selected from the predicted complete queries, where the number of queries in the subset is a predefined number, N (716). The selection may be made based on predefined criteria, such as a lexicographical order, the order of the predicted complete queries in the response received from the server, the order of entry of the complete queries in a database, and the predefined number, N. For example, in some embodiments the predicted complete queries in the response are monotonically ordered (within the response) from most popular to least popular, or highest value to lowest value, and the client selects the N most popular or N highest value queries in the response. Alternately, the client may lexicographically order (e.g., alphabetically order) the predicted complete queries in the response (720) and then select the N first queries in the reordered list of predicted complete queries.

In some embodiments, the identified (or selected) predicted complete queries are ordered by the client (718). For example, the ordering can reorder the identified (or selected) predicted complete queries in a lexicographical order (720). In some embodiments, if the partial search query matches an entry of the set of predicted complete queries, the partial search query can be placed at the top of a list (or in a predefined first place) of the predicted complete queries (722).

In some embodiments, the client formats a response, including the identified (or selected) predicted complete queries and the corresponding translations (724). In some embodiments, the server will also incorporate a spelling corrected term into the response, if a spelling corrected term is provided (726).

The client displays two or more complete queries from the set of predicted complete queries and at least portions of the translations of the displayed predicted complete queries (728), as described above with reference to FIG. 5A. The number of predicted complete queries to display and the portion of the translations to display may be determined using any of the methods described above. One skilled in the art will recognize a number of ways to present the predicted complete search queries and translations to the user. For example, the predicted complete search queries and translations can be displayed in a portion of a non-persistent window, a pop-up window, or in a portion of the current display or a portion of a user interface. The client may also display spelling corrected term, if a spelling corrected term is provided (730).

Figure 8:
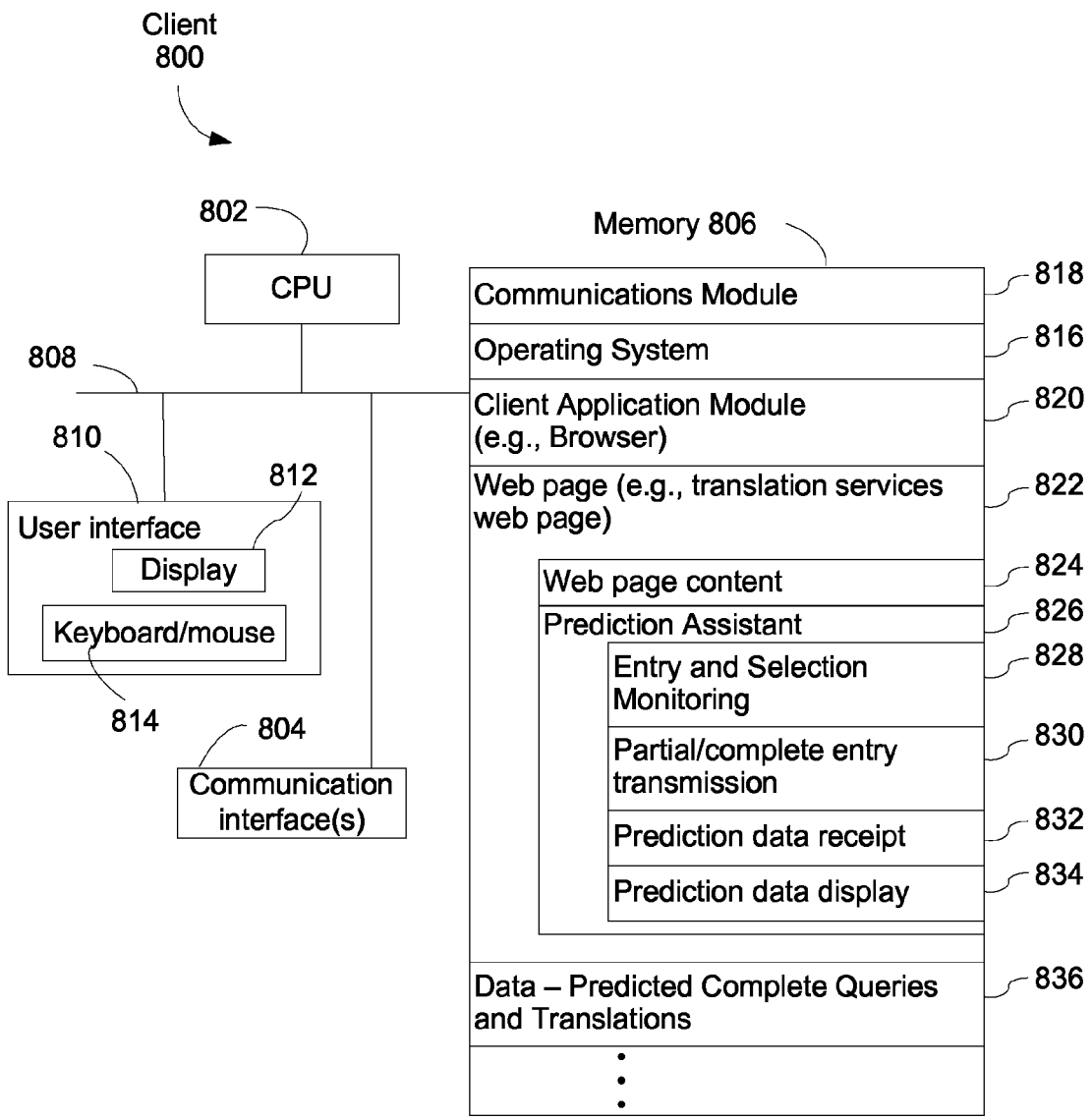
FIG. 8 is a block diagram of a server system in accordance with some embodiments.

Referring to FIG. 8, an embodiment of a client system 800 (also herein called client 800) that implements the methods described above includes one or more processing units (CPU's) 802, one or more network or other communications interfaces 804, memory 806, and one or more communication buses 808 for interconnecting these components. Client 800 is an embodiment of a client device or system that may correspond to client 202 of FIG. 2, and client 504 of FIG. 5A. The communication buses 808 may include circuitry (sometimes called a chipset) that interconnects and controls communications between system components. The client 800 may optionally include a user interface 810. In some embodiments, the user interface 810 includes a display device 812 and/or a keyboard 814, but other configurations of user interface devices may be used as well. Memory 806 may include high speed random access memory and may also include non-volatile memory, such as one or more magnetic or optical storage disks, flash memory devices, or other non-volatile solid state storage devices. The high speed random access memory may include memory devices such as DRAM, SRAM, DDR RAM or other random access solid state memory devices. Memory 806 may optionally include mass storage that is remotely located from CPU's 802. Memory 806, or alternately the non-volatile memory device(s) within memory 806, comprises a computer readable storage medium. Memory 806 stores the following elements, or a subset of these elements, and may also include additional elements:

- an operating system 816 that includes procedures for handling various basic system services and for performing hardware dependent tasks;
- a network communication module (or instructions) 818 that is used for connecting the client system 800 to other computers via the one or more communications network interfaces 804 and one or more communications networks, such as the Internet, other wide area networks, local area networks, metropolitan area networks, and so on;
- a client application 820 (e.g., an Internet browser application); the client application may include instructions for interfacing with a user to receive search queries, submitting the search queries to a server or online service, and for displaying search results;
- a web page 822, which includes web page content 824 to be displayed or otherwise presented on the client 800; the web page in conjunction with the client application 820 implements a graphical user interface for presenting web page content 824 and for interacting with a user of the client 800;
- data 836 including predicted complete search queries and corresponding translations; and
- a prediction assistant 826.

At a minimum, the prediction assistant 826 transmits partial search query information to a server. The prediction assistant may also enable the display of prediction data including the predicted complete queries and corresponding translations, and user selection of a displayed predicted complete search query. In some embodiments, the prediction assistant 826 includes the following elements, or a subset of such elements: an entry and selection monitoring module (or instructions) 828 for monitoring the entry of search queries and selecting partial search queries for transmission to the server; a partial/complete entry transmission module (or instructions) 830 for transmitting partial search queries and (optionally) completed search queries to the server; a prediction data receipt module (or instructions) 832 for receiving predicted queries; and prediction data display module (or instructions) 834 for displaying predictions and results. The transmission of final (i.e., completed) queries, receiving search results for completed queries, and displaying such results may be handled by the client application/browser 820, the prediction assistant 826, or a combination thereof. The prediction assistant 826 can be implemented in many ways.

In some embodiments, the web page (or web pages) 822 used for entry of a query and for presenting responses to the query also includes JavaScript or other embedded code, for example a Macromedia Flash object or a Microsoft Silverlight object (both of which work with respective browser plug-ins), or instructions to facilitate transmission of partial search queries to a server, for receiving and displaying predicted search queries, and for responding to user selection of any of the predicted search queries. In particular, in some embodiments the prediction assistant 826 is embedded in the web page 822, for example as an executable function, implemented using JavaScript (trademark of Sun Microsystems) or other instructions executable by the client 800. Alternately, the prediction assistant 826 is implemented as part of the client application 820, or as an extension, plug-in or toolbar of the client application 820 that is executed by the client 800 in conjunction with the client application 820. In yet other embodiments, the prediction assistant 826 is implemented as a program that is separate from the client application 820.

Figure 9:
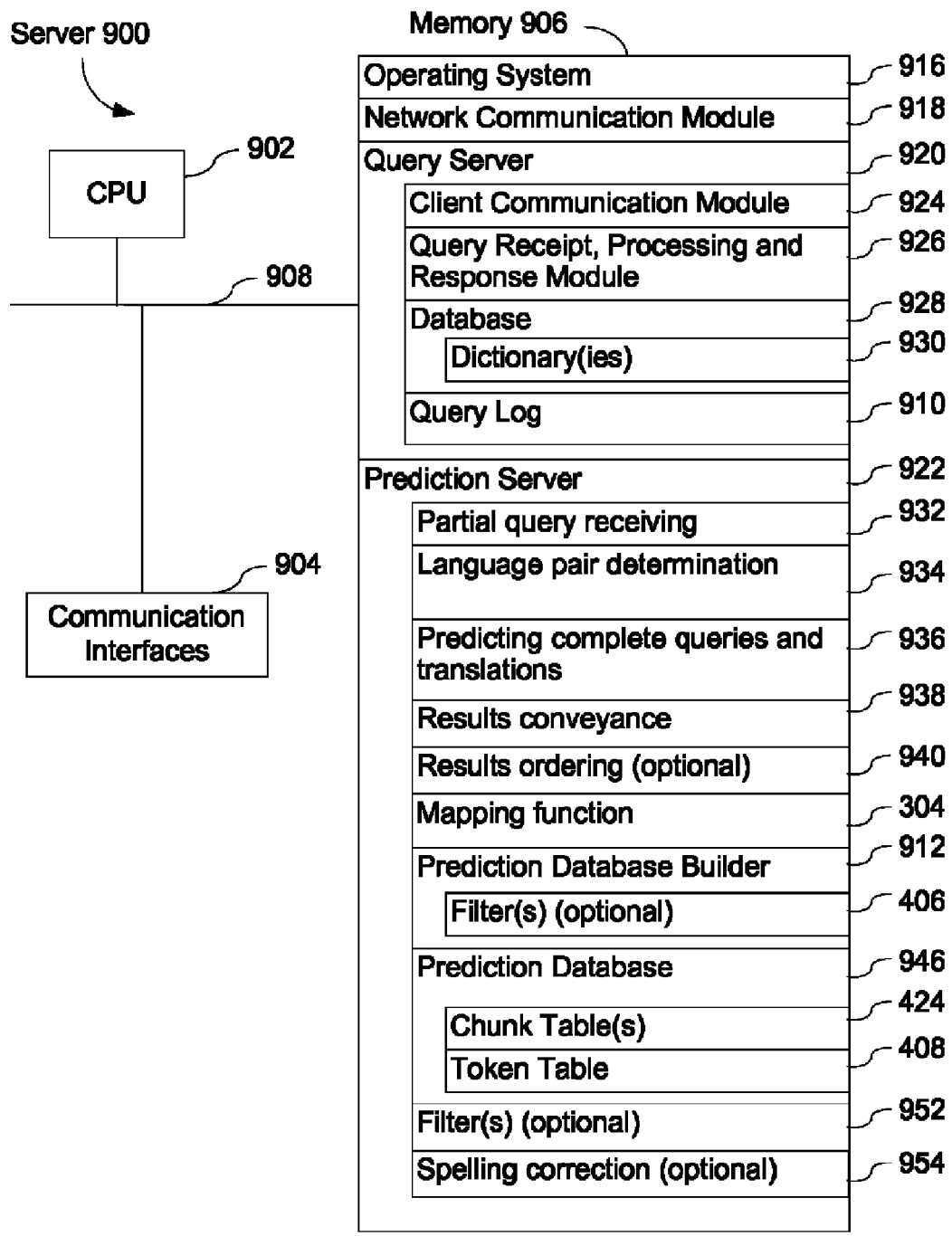
FIG. 9 is a block diagram of a client system in accordance with some embodiments.

FIG. 9 depicts an embodiment of a server system 900 that implements the methods described above. Server system 900 includes one or more processing units (CPU's) 902, one or more network or other communications interfaces 904, memory 906, and one or more communication buses 908 for interconnecting these components. The communication buses 908 may include circuitry (sometimes called a chipset) that interconnects and controls communications between system components. It should be understood that in some other embodiments the server system 900 may be implemented using multiple servers so as to improve its throughput and reliability. For instance the query log 910 could be implemented on a distinct server that communications with and works in conjunction with other ones of the servers in the server system 900. As another example, the prediction database builder 912 could be implemented in separate servers or computing devices. Thus, FIG. 9 is intended more as functional description of the various features which may be present in a set of servers than as a structural schematic of the embodiments described herein. The actual number of servers used to implement a server system 900 and how features are allocated among them will vary from one implementation to another, and may depend in part on the amount of data traffic that the system must handle during peak usage periods as well as during average usage periods.

Memory 906 may include high speed random access memory and may also include non-volatile memory, such as one or more magnetic or optical storage disks, flash memory devices, or other non-volatile solid state storage devices. The high speed random access memory may include memory devices such as DRAM, SRAM, DDR RAM or other random access solid state memory devices. Memory 906 may optionally include mass storage that is remotely located from CPU's 902. Memory 906, or alternately the non-volatile memory device(s) within memory 906, comprises a computer readable storage medium. Memory 906 stores the following elements, or a subset of these elements, and may also include additional elements:

- an operating system 916 that includes procedures for handling various basic system services and for performing hardware dependent tasks;
- a network communication module (or instructions) 918 that is used for connecting the server system 900 to other computers via the one or more communications network interfaces 904 and one or more communications networks, such as the Internet, other wide area networks, local area networks, metropolitan area networks, and so on;
- a query server 920 for receiving, from a client, complete search queries and for producing and conveying responses; and
- a prediction server 922 for receiving, from a client, partial search queries and for producing and conveying responses.

The query server 920 may include the following elements, or a subset of these elements, and may also include additional elements:

- a client communication module (or instructions) 924 that is used for communicating queries and responses with a client;
- a query receipt, processing and response module (or instructions) 926;
- a database 928, including one or more dictionaries 930 that contain information including translations and optionally additional information, such as examples of use of the word or term in various contexts; and
- an optional query log 910 that contains information about queries submitted by a community of users.

The prediction server 922 may include the following elements, a subset of these elements, and may also include additional elements:

- a partial query receiving module (or instructions) 932;
- a language pair determination module (or instructions) 934;
- a module (or instructions) for predicting complete search queries and obtaining translations 936;
- a results conveyance module (or instructions) 938;
- a mapping function 304;
- a prediction database builder 912 that may optionally include one or more filters 406; and
- a prediction database 946 that may include one or more chunk tables 424 and one or more token tables 408 (described above with reference to FIG. 4).

In addition, the prediction server 922 may optionally include:

- a results ordering module (or instructions) 940;
- a filter module (or instructions) 952; and
- a spelling correction module (or instructions) 954.

Although the discussion herein has been made with reference to a server designed for use with a dictionary or translation database remotely located from the search requestor, it should be understood that the concepts disclosed herein are equally applicable to other search environments. For example, the same techniques described herein could apply to queries against any type of information repository against which queries, or searches, are run. Accordingly, the term "server" should be broadly construed to encompass all such uses.

Although illustrated in FIGS. 8 and 9 as distinct modules or components, the various modules or components may be located or co-located within either the server or the client. For example, in some embodiments, portions of prediction server 922, and/or the prediction database 946 are resident on the client system 800 or form part of the prediction assistant 826. For example, in some embodiments mapping function 942 and token table 408 and chunk table 424 for the most popular searches may be periodically downloaded to a client system 800, thereby providing fully client-based processing for at least some partially search queries.

In another embodiment, the prediction assistant 826 may include a local version of the prediction server 922, for making complete search query predictions based at least in part on prior queries by the user. Alternately, or in addition, the local prediction server may generate predictions based on data downloaded from a server or remote prediction server. Further, the prediction assistant 826 may merge locally generated and remotely generated prediction sets for presentation to the user. The results could be merged in any of a number of ways, for example, by interleaving the two sets or by merging the sets while biasing queries previously submitted by the user such that those queries would tend to be placed or inserted toward the top of the combined list of predicted queries. In some embodiments, the prediction assistant 826 inserts queries deemed important to the user into the set of predictions. For example, a query frequently submitted by the user, but not included in the set obtained from the server could be inserted into the predictions.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for processing query information, comprising:
at a server system with one or more processors and memory storing one or more programs for execution by the one or more processors, the one or more programs storing instructions for:
prior to a user of a client device signaling completion of a search query:
receiving from the client device a partial search query, the client device located remotely from the server;
predicting from the partial search query a set of predicted complete queries relevant to the partial search query, where the predicted complete queries comprise previously submitted complete queries submitted by a community of users, wherein the partial search query and the set of predicted complete queries are in a first language;
subsequent to the predicting, obtaining translations of at least a subset of the set of predicted complete queries, wherein the translations are in a second language different from the first language, and the subset comprises multiple predicted complete queries, wherein the first and second languages are predicted based, at least in part, on the partial search query; and
conveying both the set of predicted complete queries and the corresponding translations to the client device for concurrent display.

2. The method of claim 1, wherein the receiving, predicting and conveying comprise a single transaction between the client device and the server system.

3. The method of claim 1, wherein the first language is one language of a predefined set of two languages and the second language is the other language of the predefined set of two languages.

4. The method of claim 3, wherein the predefined set of two languages is selected by a search requestor at the client device.

5. The method of claim 1, wherein the partial search query is received from a translation web page displayed at the client device.

6. The method of claim 1, wherein the predicting includes obtaining the predicted complete queries from prediction information, computed prior to receiving the partial search query, that associates the predicted complete queries with the partial search query.

7. The method of claim 1, further comprising ordering the set of predicted complete queries in accordance with ranking criteria.

8. The method of claim 7, wherein, when the partial search query is a member of the set of predicted complete queries, the ordering includes placing the partial search query at a top position of the ordered set of predicted complete queries.

9. The method of claim 7, wherein the ordering includes ordering the set in lexicographical order.

10. The method of claim 1, wherein obtaining translations includes looking up translations of the set of predicted complete queries from a predefined table.

11. The method of claim 1, further comprising removing a set of predefined queries from the set of predicted complete queries.

12. The method of claim 1, wherein the predicted complete queries are pre-filtered to remove a set of predefined complete queries.

13. The method of claim 1, further comprising reducing the size of the set to N, wherein the N is a predefined number.

14. The method of claim 1, wherein the predicting includes mapping the partial search query to an entry in a chunk table; the chunk table comprising pointers to entries in a token table; the token table comprising entries having queries and corresponding translations.

15. The method of claim 1, wherein the set of predicted complete queries includes a respective predicted complete query that is an abbreviation or shortened term, and the method includes obtaining a completion or synonym of the abbreviation or shortened term, wherein both the respective predicted complete query and the completion or synonym are in a same language.

16. The method of claim 1, wherein at least one of the predicted complete queries does not include the entire partial search query.

17. The method of claim 1, wherein the subset of predicted complete queries includes multiple predicted complete queries distinct from the partial search query.

18. A method for processing query information, comprising:
at a client device with one or more processors and memory storing one or more programs for execution by the one or more processors, the one or more programs storing instructions for:
prior to a search requestor of the client device signaling completion of a search query:
receiving from the search requestor a partial search query;
obtaining, from a server system that is remote from the client device, a set of predicted complete queries relevant to the partial search query and translations of at least a subset of the set of predicted complete queries, wherein the predicted complete queries comprise previously submitted complete queries submitted by a community of users, the partial search query and the set of predicted complete queries are in a first language, the translations are in a second language different from the first language, the first and second languages are predicted based, at least in part, on the partial search query, and the subset comprises multiple predicted complete queries; and
concurrently displaying two or more complete queries from the set of predicted complete queries and at least portions of the translations of the two or more complete queries.

19. The method of claim 18, wherein the predicted complete queries and the translations are obtained in a single transaction with the server system.

20. The method of claim 18, wherein the first language is one language of a predefined set of two languages and the second language is the other language of the predefined set of two languages.

21. The method of claim 20, wherein the predefined set of two languages is selected by the search requestor.

22. The method of claim 20, wherein the partial search query is received from a web page displayed at the client device, and the predefined set of two languages is selected by the search requestor from a list of predefined pairs of languages.

23. The method of claim 18, wherein the partial search query is received from a translation web page displayed at the client device.

24. The method of claim 18, wherein the predicted complete queries are complete queries previously submitted to the server by the community of users.

25. The method of claim 18, further comprising ordering the set of predicted complete queries in accordance with ranking criteria.

26. The method of claim 25, wherein the ordering includes ordering the set in lexicographical order.

27. The method of claim 25, wherein, if the partial search query is a member of the set of predicted complete queries, the ordering includes placing the partial search query at a top position of the ordered set of predicted complete queries.

28. The method of claim 18, wherein the set of predicted complete queries have been filtered to remove a set of predefined queries.

29. The method of claim 18, further comprising reducing the size of the set to N, wherein the N is a predefined number.

30. The method of claim 18, wherein the set of predicted complete queries includes a respective predicted complete query that is an abbreviation or shortened term, and the method includes obtaining from the server a completion or synonym of the abbreviation or shortened term, wherein both the respective predicted complete query and the completion or synonym are in a same language.

31. A server system for processing query information, comprising:
one or more processors; and
memory to store data and one or more programs to be executed by the one or more processors, the one or more programs including instructions for:
prior to a user of a client device signaling completion of a search query:
receiving from a search requestor a partial search query, the search requestor located remotely from the server system;
predicting from the partial search query a set of predicted complete queries relevant to the partial search query, where the predicted complete queries comprise previously submitted complete queries submitted by a community of users, wherein the partial search query and the set of predicted complete queries are in a first language;
subsequent to the predicting, obtaining translations of at least a subset of the set of predicted complete queries, wherein the translations are in a second language different from the first language, and the subset comprises multiple predicted complete queries, wherein the first and second languages are predicted based, at least in part, on the partial search query; and
conveying both the set of predicted complete queries and the corresponding translations to the search requestor for concurrent display.

32. The server system of claim 31, including:
data, stored in the memory, the data representing complete queries previously submitted by a community of users, and translations of the complete queries;
wherein the instructions for predicting and for obtaining comprise instructions for extracting from the stored data, data representing the predicted complete queries and the translations of the set of predicted complete queries.

33. The server system of claim 31, wherein at least one of the predicted complete queries does not include the entire partial search query.

34. The server system of claim 31, wherein:
the first language is one language of a predefined set of two languages, and the second language is the other language of the predefined set of two languages; and
the one or more program include instructions for predicting the predefined set of two languages based, at least in part, on an Internet protocol address of the client device.

35. The server system of claim 31, wherein the subset of predicted complete queries includes multiple predicted complete queries distinct from the partial search query.

36. A client system for processing query information, comprising:
one or more processors; and
memory to store data and one or more programs to be executed by the one or more processors, the one or more programs including instructions for:
prior to a search requestor of the client system signaling completion of a search query:
receiving from the search requestor a partial search query;
obtaining, from a server system that is remote from the client system, a set of predicted complete queries relevant to the partial search query and translations of at least a subset of the set of predicted complete queries, wherein the predicted complete queries comprise previously submitted complete queries submitted by a community of users, the partial search query and the set of predicted complete queries are in a first language, the translations are in a second language different from the first language, the first and second languages are predicted based, at least in part, on the partial search query, and the subset comprises multiple predicted complete queries; and
concurrently displaying two or more complete queries from the set of predicted complete queries and at least portions of the translations of the two or more complete queries.

37. The system of claim 36, including:
data, stored in the memory, including a web page to be displayed at the client system and prediction data representing the set of predicted complete search queries and translations obtained from the server system, wherein at least a subset of the prediction data is for display within the web page.

38. A non-transitory computer readable storage medium storing one or more programs for execution by one or more processors of a server system, the one or more programs comprising instruction for:
prior to a user of a client device signaling completion of a search query:
receiving from the client device a partial search query, the client device located remotely from the server system;
predicting from the partial search query a set of predicted complete queries relevant to the partial search query, where the predicted complete queries comprise previously submitted complete queries submitted by a community of users, wherein the partial search query and the set of predicted complete queries are in a first language;

subsequent to the predicting, obtaining translations of at least a subset of the set of predicted complete queries, wherein the translations are in a second language different from the first language, and the subset comprises multiple predicted complete queries, wherein the first and second languages are predicted based, at least in part, on the partial search query; and conveying both the set of predicted complete queries and the corresponding translations to the client device for concurrent display.

39. The computer readable storage medium of claim 38, wherein at least one of the predicted complete queries does not include the entire partial search query.

40. The computer readable storage medium of claim 38, wherein:

the first language is one language of a predefined set of two languages, and the second language is the other language of the predefined set of two languages; and the one or more program include instructions for predicting the predefined set of two languages based, at least in part, on an Internet protocol address of the client device.

41. The computer readable storage medium of claim 38, wherein the subset of predicted complete queries includes multiple predicted complete queries distinct from the partial search query.

42. A non-transitory computer readable storage medium storing one or more programs for execution by one or more processors of a client device or system, the one or more programs comprising instructions for:

prior to a search requestor of the client device or system signaling completion of a search query:

receiving from the search requestor a partial search query;

obtaining, from a server system that is remote from the client device or system, a set of predicted complete queries relevant to the partial search query and translations of at least a subset of the set of predicted complete queries, wherein the predicted complete queries comprise previously submitted complete queries submitted by a community of users, the partial search query and the set of predicted complete queries are in a first language, the translations are in a second language different from the first language, the first and second languages are predicted based, at least in part, on the partial search query, and the subset comprises multiple predicted complete queries; and concurrently displaying two or more complete queries from the set of predicted complete queries and at least portions of the translations of the two or more complete queries.

* * * * *